United States Patent
Yanase et al.

(10) Patent No.: US 9,264,653 B2
(45) Date of Patent: Feb. 16, 2016

(54) VIDEO AND AUDIO REPRODUCTION APPARATUS, AND VIDEO AND AUDIO REPRODUCTION METHOD

(75) Inventors: Kazuhide Yanase, Osaka (JP); Takayuki Matsui, Osaka (JP); Eiichi Moriyama, Kyoto (JP); Masahiro Nakahira, Osaka (JP); Yoko Kubo, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 578 days.

(21) Appl. No.: 13/005,028

(22) Filed: Jan. 12, 2011

(65) Prior Publication Data

US 2011/0110645 A1 May 12, 2011

Related U.S. Application Data

(63) Continuation of application No. PCT/JP2009/003266, filed on Jul. 13, 2009.

(30) Foreign Application Priority Data

Jul. 14, 2008 (JP) ................................. 2008-183239

(51) Int. Cl.
*H04N 5/775* (2006.01)
*H04N 5/85* (2006.01)
(Continued)

(52) U.S. Cl.
CPC .................. *H04N 5/85* (2013.01); *H04N 5/765* (2013.01); *H04N 5/775* (2013.01); *H04N 5/91* (2013.01);
(Continued)

(58) Field of Classification Search
CPC .......................................... H04N 5/765–5/775

USPC ............................................... 386/230, E5.07
See application file for complete search history.

(56) References Cited

U.S. PATENT DOCUMENTS

2003/0090590 A1  5/2003 Yoshizawa et al.
2004/0218100 A1* 11/2004 Staker et al. .................. 348/592
(Continued)

FOREIGN PATENT DOCUMENTS

JP    2005-51547     2/2005
JP    2006-352458    12/2006
(Continued)

OTHER PUBLICATIONS

Japanese Notice of Allowance issued in Japanese Patent Application No. 2008-183239 mailed on Feb. 12, 2013.
(Continued)

*Primary Examiner* — Thai Tran
*Assistant Examiner* — Nien-Ru Yang
(74) *Attorney, Agent, or Firm* — McDermott Will & Emery LLP

(57) ABSTRACT

The DVD player includes: a reproducing unit reproducing audio data and video data; a first transmission unit converting, into first data in accordance with a first standard, the audio data and video data reproduced by the reproducing unit, and transmitting the first data to the television; a second transmission unit converting, into second data in accordance with a second standard, the audio data and video data reproduced by the reproducing unit, and transmitting the second data to the television; a display determination unit determining whether or not to display an error message regarding an error occurring in the first transmission unit based on whether or not the video is displayed using the first data; and a display control unit causing the message display unit to display the error message according to a result of the determination by the display determination unit.

10 Claims, 10 Drawing Sheets

(51) Int. Cl.
  *H04N 5/765* (2006.01)
  *H04N 5/91* (2006.01)
  *H04N 9/79* (2006.01)
  *H04N 9/82* (2006.01)
  *H04N 21/41* (2011.01)
  *H04N 21/436* (2011.01)
  *H04N 21/4363* (2011.01)

(52) U.S. Cl.
  CPC ............ *H04N 9/7921* (2013.01); *H04N 9/8205* (2013.01); *H04N 21/4122* (2013.01); *H04N 21/4135* (2013.01); *H04N 21/43622* (2013.01); *H04N 21/43632* (2013.01)

(56) References Cited

U.S. PATENT DOCUMENTS

| | | | |
|---|---|---|---|
| 2006/0001554 A1* | 1/2006 | Morishita | 341/50 |
| 2006/0125959 A1 | 6/2006 | Yoshizawa et al. | |
| 2007/0046835 A1* | 3/2007 | Kim et al. | 348/731 |
| 2008/0025707 A1 | 1/2008 | Sawada et al. | |
| 2008/0050097 A1* | 2/2008 | Takamori | 386/106 |
| 2008/0127312 A1 | 5/2008 | Iwamoto et al. | |
| 2008/0155639 A1* | 6/2008 | Miyagi | 725/139 |
| 2008/0297656 A1* | 12/2008 | Saito | 348/554 |
| 2009/0118018 A1* | 5/2009 | Perlman et al. | 463/42 |
| 2011/0002557 A1* | 1/2011 | Kim | 382/285 |

FOREIGN PATENT DOCUMENTS

| | | |
|---|---|---|
| JP | 2007-141345 A | 6/2007 |
| JP | 2007-215208 | 8/2007 |
| JP | 2007-220170 | 8/2007 |
| JP | 4020162 | 10/2007 |
| JP | 2008-52776 | 3/2008 |
| JP | 2008-52887 | 3/2008 |
| JP | 2008-131557 | 6/2008 |
| JP | 2010-21975 | 1/2010 |
| KR | 2008-0036440 A | 4/2008 |

OTHER PUBLICATIONS

International Search Report of PCT/JP2009/003266.
Extended European Search Report issued in European Patent Application No. 09797683.1 mailed Oct. 26, 2012.

* cited by examiner

FIG. 1
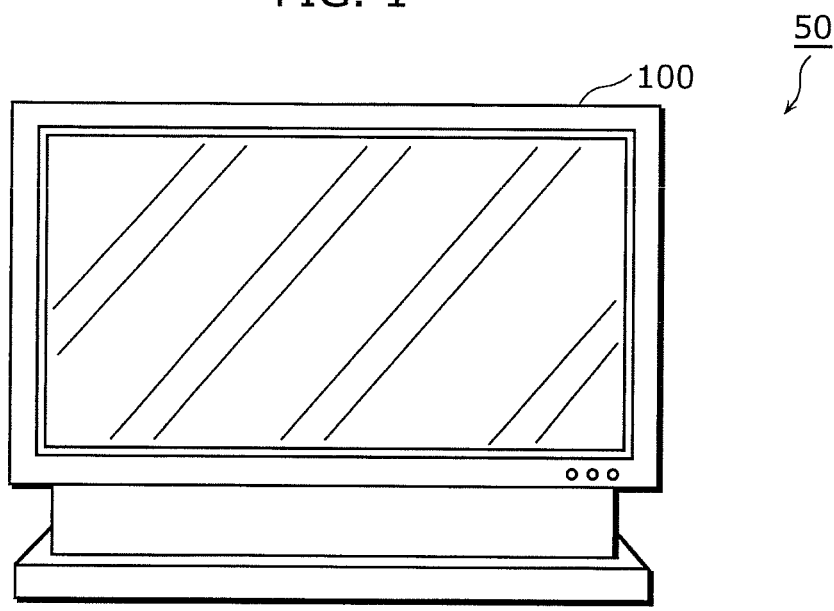
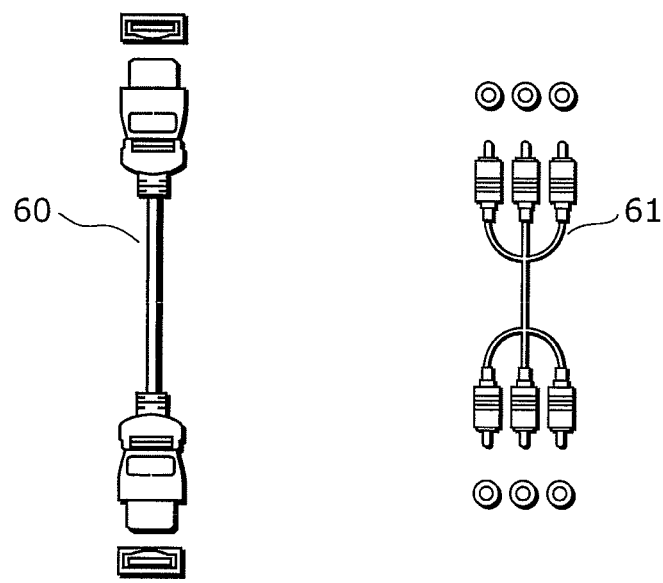
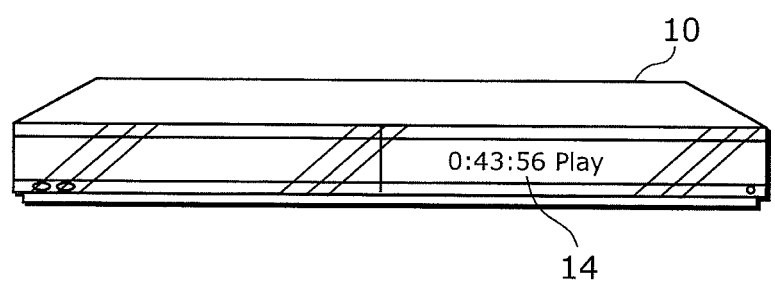

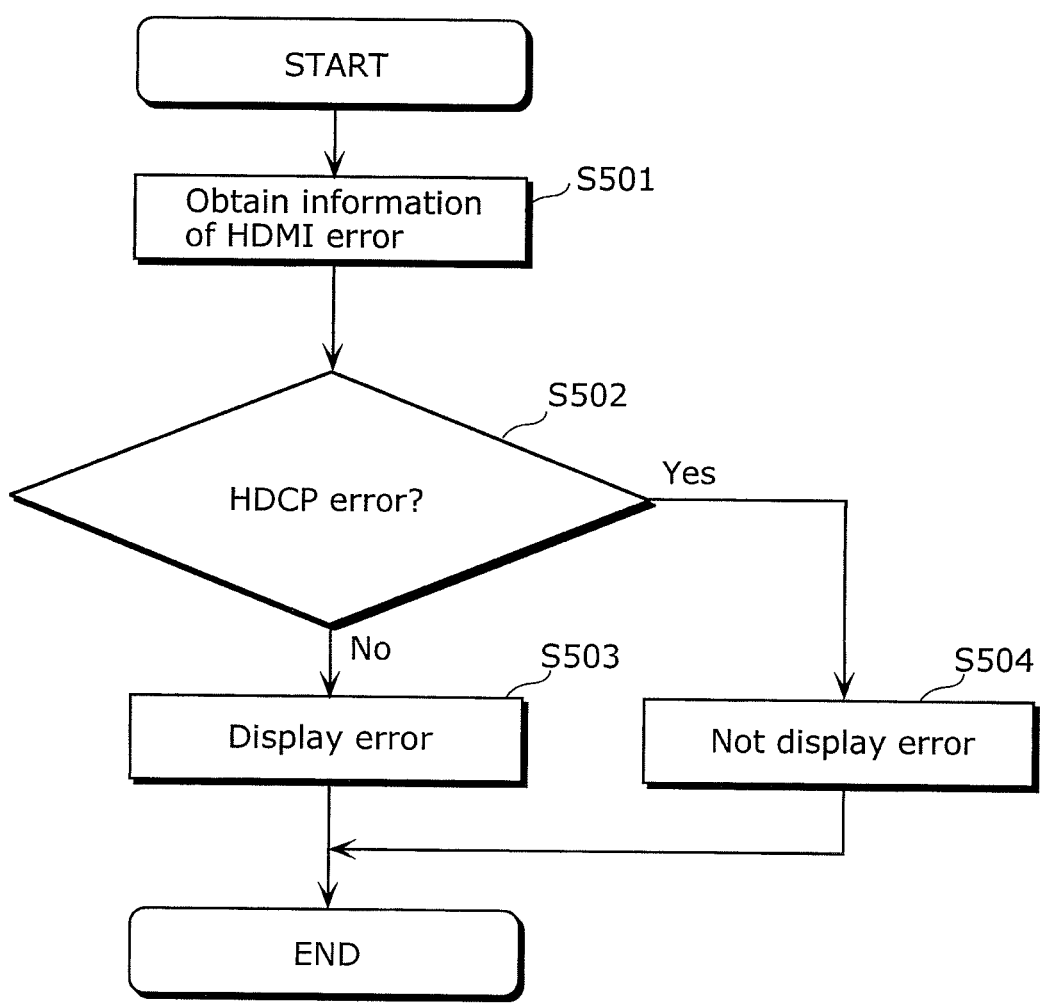

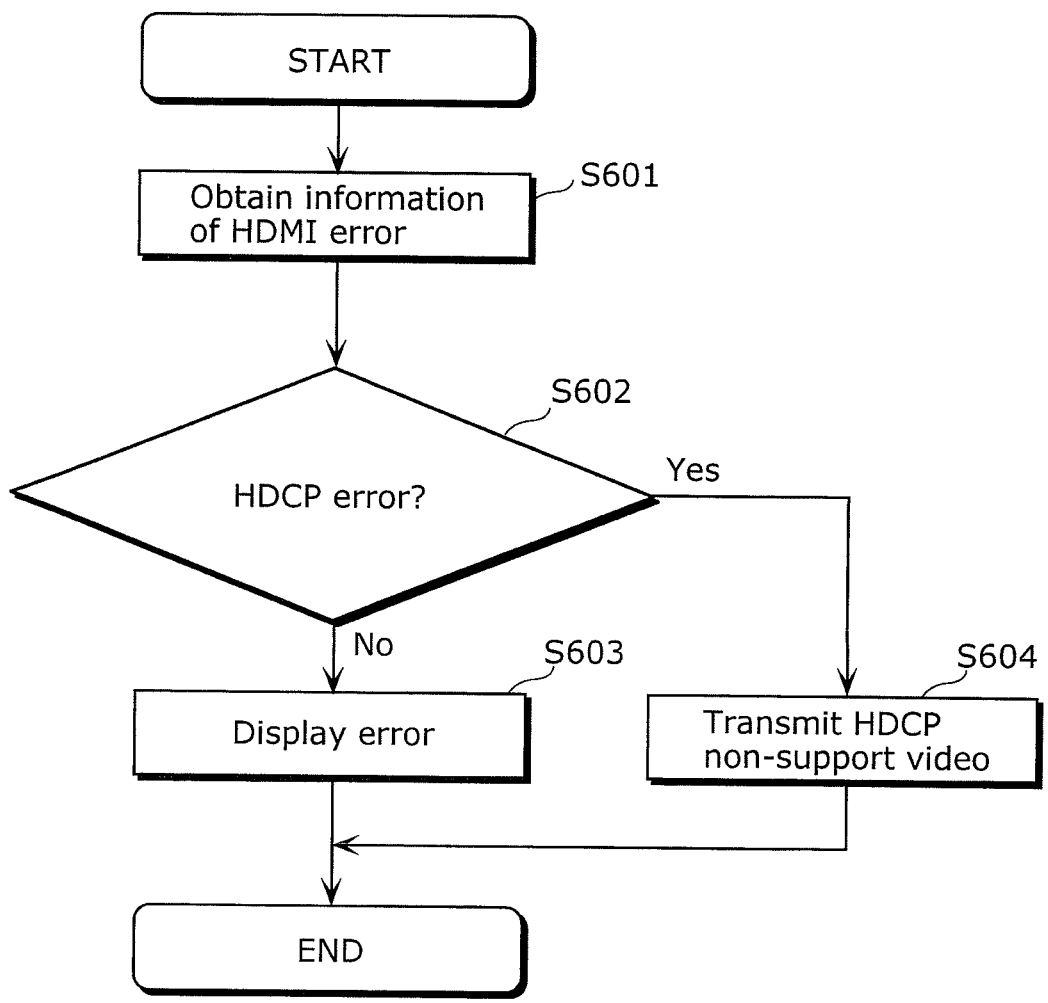

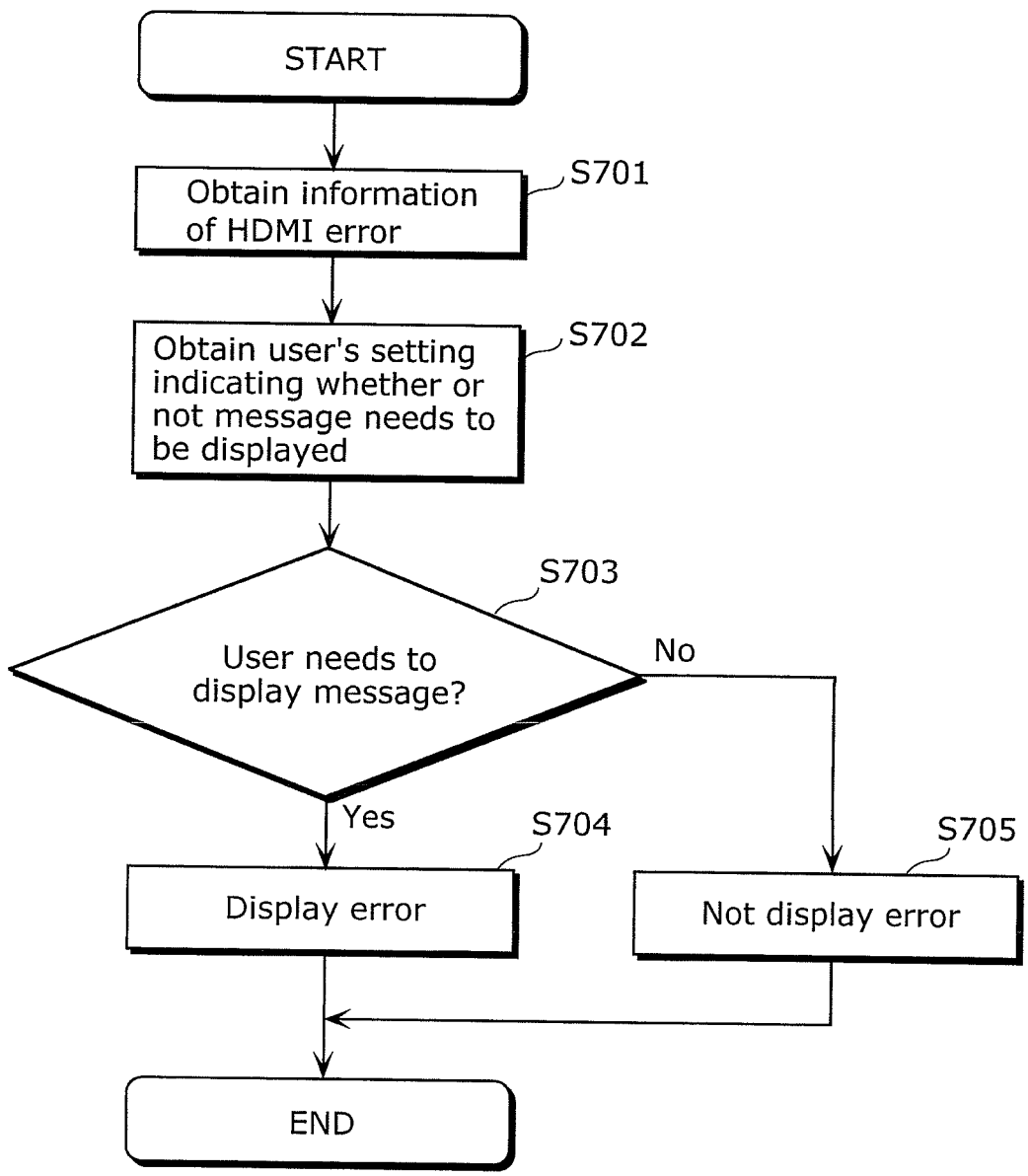

VIDEO AND AUDIO REPRODUCTION APPARATUS, AND VIDEO AND AUDIO REPRODUCTION METHOD

CROSS REFERENCE TO RELATED APPLICATION

This is a continuation application of PCT application No. PCT/JP09/003266 filed on Jul. 13, 2009, designating the United States of America.

BACKGROUND OF THE INVENTION (1) Field of the Invention

The present invention relates to a video and audio reproduction apparatus, and in particular, to a video and audio reproduction apparatus that is connectable to a video and audio reception apparatus.

(2) Description of the Related Art

The video and audio reproduction apparatuses, such as a Digital Versatile Disk (DVD) player, a DVD recorder, a Blu-ray Disc (BD) recorder, and a BD player reproduce video and audio recorded on recording media, and provide the reproduced data to video and audio reception apparatuses, such as a television (TV) receiver and an AV amplifier. Such video and audio reproduction apparatuses are connected to video and audio reception apparatuses through cables, such as a High-Definition Multimedia Interface (HDMI) cable, a component cable, and a composite cable (RCA cable).

Furthermore, in the case where an error occurs when a video and audio reproduction apparatus is HDMI-connected to a video and audio reception apparatus, the video and audio reproduction apparatus displays that the error occurs in an HDMI, on a front panel or an On-Screen display (OSD) that are included in the video and audio reproduction apparatus. The errors here include, for example, an HDMI non-support error, a DDC communication error, and an authentication error in an HDMI-supporting apparatus.

Furthermore, Japanese Patent No. 4020162 (hereinafter referred to as PTL 1) discloses a conventional video and audio reproduction apparatus that automatically determines an event corresponding to a current state and displays a favorable message corresponding to the corresponding event.

SUMMARY OF THE INVENTION

However, the video and audio reproduction apparatus disclosed in PTL 1 displays a message even when there is no need to display the message. Thereby, there is a problem that the user has difficulties in viewing time information and channel information displayed on the front panel, or video displayed on the video and audio reception apparatus that is being viewed by the user.

More specifically, even when a video and audio reproduction apparatus is connected to a video and audio reception apparatus through the HDMI cable, there are cases where these apparatuses are further connected through another cable (component cable, composite cable, or others). In other words, even when an error occurs in an HDMI, the video and audio reception apparatus sometimes displays video and emits sound that are received through another cable according to the setting by the user.

As such, in the case where the user views video and audio except from the HDMI, even when an error occurs in the HDMI, there is no problem that the video is not displayed on and sound is not emitted to the video and audio reception apparatus. Thus, the user has no particular problem. However, displaying an error message in any occasion causes the user to have difficulties in viewing information displayed on a front panel, for example.

Although the problem is solved by not displaying the error message of the HDMI here, what is not displayed includes information that the user desires to know, such as an error caused by degradation in a cable, for example. Accordingly, the user has difficulties in detecting an occurring error. Thus, when there is a trouble, such as a case where video is not displayed, a problem, for example, that the user always needs to receive support from a manufacturer occurs.

The present invention is to solve the problems, and has an object of providing a video and audio reproduction apparatus that can appropriately display an error message.

In order to attain the object, the video and audio reproduction apparatus according to an aspect of the present invention is a video and audio reproduction apparatus connectable to a video and audio reception apparatus that displays video and emits sound, and includes: a reproducing unit configured to reproduce audio data and video data; a first transmission unit configured to convert, into first data in accordance with a first standard, the audio data and the video data reproduced by the reproducing unit, and to transmit the first data to the video and audio reception apparatus; a second transmission unit configured to convert, into second data in accordance with a second standard, the audio data and the video data reproduced by the reproducing unit, and to transmit the second data to the video and audio reception apparatus; a message display unit configured to display a message; a display determination unit configured to determine to display an error message regarding an error occurring in the first transmission unit when the video and audio reception apparatus displays the video and emits the sound using the first data, and to determine not to display the error message when the video and audio reception apparatus does not display the video and emit the sound using the first data; and a display control unit configured to cause the message display unit to display the error message when the display determination unit determines to display the error message, and not to cause the message display unit to display the error message when the display determination unit determines not to display the error message.

With the configuration, when the video and audio reception apparatus does not display video using data of the first standard, even in the case where an error occurs in the first transmission unit, the video and audio reproduction apparatus according to an aspect of the present invention does not display any error message. Thereby, since the video and audio reproduction apparatus according to the aspect of the present invention does not display an unnecessary error message, it is possible to prevent the user from having difficulties in viewing the information on reproducing the video data and the audio data (time information and channel information, etc.). In other words, the video and audio reproduction apparatus according to the aspect of the present invention can appropriately display the error message.

Furthermore, the display determination unit may be configured to determine whether or not the video and audio reception apparatus displays the video and emits the sound using the first data, based on information transmitted from the video and audio reception apparatus in interactive message communication included in the first standard.

With the configuration, the video and audio reproduction apparatus according to an aspect of the present invention can appropriately display the error message using information transmitted from the video and audio reception apparatus.

Furthermore, the display control unit may be configured to cause the message display unit to display the error message when the display determination unit determines to display the error message, the error message prompting switching of data to be used by the video and audio reception apparatus for displaying the video and emitting the sound from the first data to the second data.

With the configuration, the user can continue to view video reproduced by the video and audio reproduction apparatus, in accordance with the displayed message.

Furthermore, the display control unit may be further configured to cause the video and audio reception apparatus to switch data to be used for displaying the video and emitting the sound from the first data to the second data, when the display determination unit determines to display the error message.

With the configuration, when an error occurs in the first transmission unit, the video and audio reproduction apparatus according to an aspect of the present invention can automatically switch data to be used by the video and audio reception apparatus. Thereby, the user can continue to view video reproduced by the video and audio reproduction apparatus.

Furthermore, the display determination unit may be further configured to determine not to display the error message regarding the error when the error is defined in an apparatus authentication standard used in the first standard.

With the configuration, the video and audio reproduction apparatus according to an aspect of the present invention does not display the error message when the video and audio reception apparatus does not conform to the apparatus authentication standard. In other words, the video and audio reproduction apparatus according to the aspect of the present invention displays an error message regarding an error important to the user, such as a break in a cable, whereas it does not display an error message regarding an error that is less important to the user, such as a case when the video and audio reception apparatus does not conform to the apparatus authentication standard.

Furthermore, the display determination unit may be further configured to control the first transmission unit to transmit, to the video and audio reception apparatus, one of the video data and the audio data that does not require apparatus authentication in accordance with an apparatus authentication standard, when the error is defined in the apparatus authentication standard used in the first standard.

With the configuration, the user can determine whether the occurring error indicates that the video and audio reception apparatus does not conform to the apparatus authentication standard, the apparatus authentication has failed, or there is a break in a cable, based on whether or not video is to be displayed on (or sound is emitted to) the video and audio reception apparatus. More specifically, the user can determine that there is the break in the cable when video is not displayed on the video and audio reception apparatus.

Furthermore, the apparatus authentication standard may be an HDCP standard.

Furthermore, the video and audio reproduction apparatus may further include a setting storage unit configured to store setting information indicating whether or not the error message regarding the error occurring in the first transmission unit is to be displayed, the setting information being set by a user operation, wherein the display determination unit may be further configured to determine whether or not the error message regarding the error occurring in the first transmission unit is to be displayed, based on the setting information stored by the setting storage unit.

With the configuration, the user can set whether or not the error message is to be displayed.

Furthermore, the first standard may be an HDMI standard.

Furthermore, the second standard is one of a composite standard and a component standard.

Furthermore, the video and audio reproduction method according to an aspect of the present invention is a video and audio reproduction method performed by a video and audio reproduction apparatus connectable to a video and audio reception apparatus that displays video and emits sound, and the method includes: reproducing audio data and video data; converting, into first data in accordance with a first standard, the audio data and the video data reproduced in the reproducing, and transmitting the first data to the video and audio reception apparatus; converting, into second data in accordance with a second standard, the audio data and the video data reproduced in the reproducing, and transmitting the second data to the video and audio reception apparatus; determining to display an error message regarding an error occurring in the transmitting of the first data when the video and audio reception apparatus displays the video and emits the sound using the first data, and determining not to display the error message when the video and audio reception apparatus does not display the video and emit the sound using the first data; and displaying the error message when it is determined in the determining to display the error message, and not displaying the error message when it is determined in the determining not to display the error message.

Thereby, when the video and audio reception apparatus does not display video using data that conforms to the first standard, even in the case where an error occurs in the transmitting of the first data, any error message is not displayed by the video and audio reproduction method according to an aspect of the present invention. Thereby, since the video and audio reproduction apparatus according to the aspect of the present invention does not display an unnecessary error message, it is possible to prevent the user from having difficulties in viewing the information on reproducing the video data and the audio data (time information and channel information, etc.). In other words, with the video and audio reproduction method according to the aspect of the present invention, the error message can be appropriately displayed.

The present invention may be implemented as such a video and audio reproduction apparatus but also as a video and audio reproduction method using the characteristic units included in the video and audio reproduction apparatus as steps, and as a program that causes a computer to execute such characteristic steps. Such a program can obviously be distributed through recording media such as a CD-ROM and via transmission media such as the Internet.

Advantageous Effects of Invention

As described above, the present invention can provide a video and audio reproduction apparatus and a video and audio reproduction method for enabling the appropriate display of an error message.

FURTHER INFORMATION ABOUT TECHNICAL BACKGROUND TO THIS APPLICATION

The disclosure of Japanese Patent Application No. 2008-183239 filed on Jul. 14, 2008 including specification, drawings and claims is incorporated herein by reference in its entirety.

The disclosure of PCT application No. PCT/JP09/003266 filed on Jul. 13, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 schematically illustrates a video and audio reproduction system according to Embodiment 1 in the present invention;

FIG. 8 is a flowchart illustrating the procedure for displaying an error message by a video and audio reproduction apparatus according to Embodiment 5 in the present invention;

FIG. 9 is a flowchart illustrating the procedure for displaying an error message by a video and audio reproduction apparatus according to Embodiment 6 in the present invention; and FIG. 10 is a flowchart illustrating the procedure for displaying an error message by a video and audio reproduction apparatus according to Embodiment 7 in the present invention.

DESCRIPTION OF THE PREFERRED EMBODIMENTS

Figure 2:
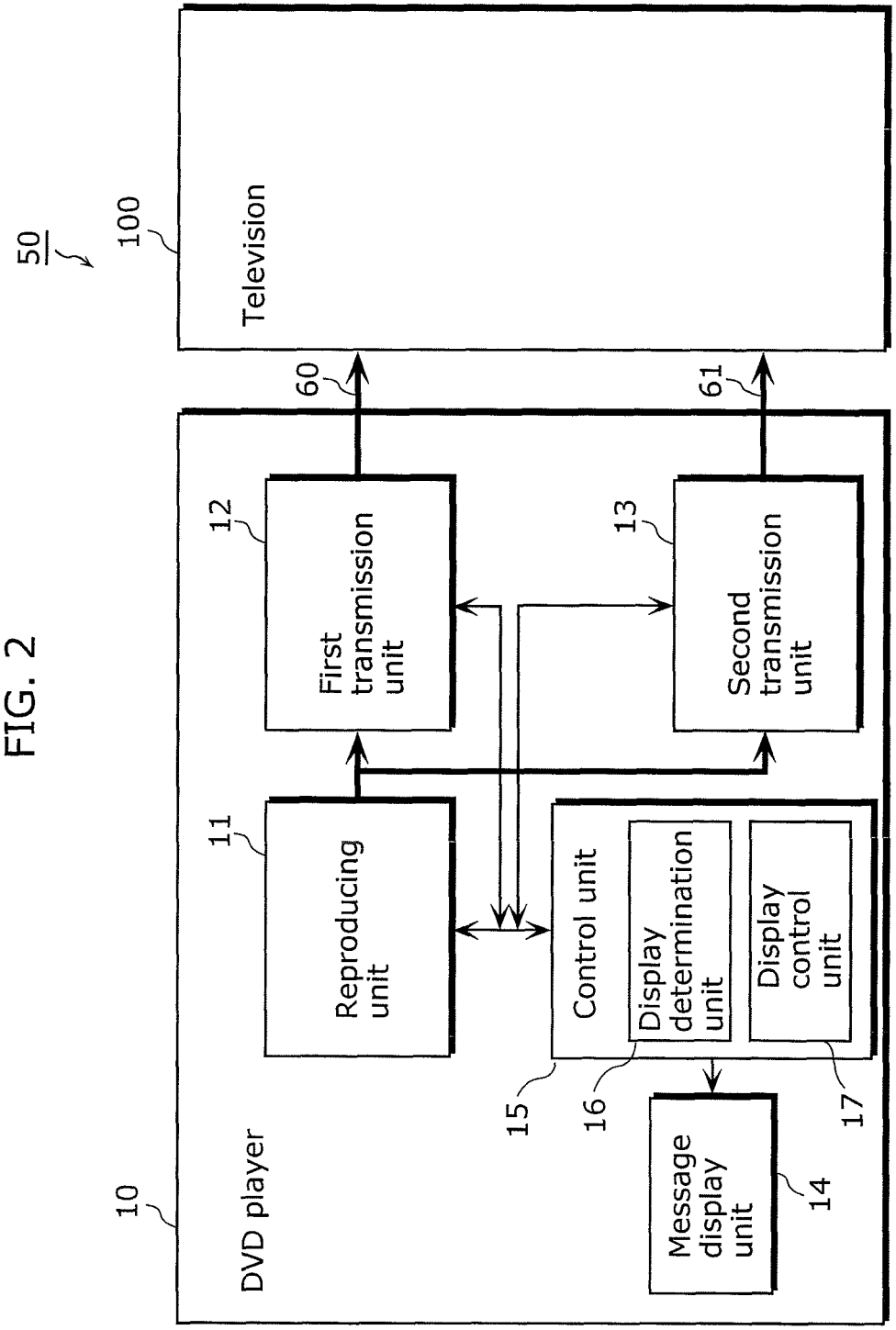
FIG. 2 is a block diagram illustrating a configuration of a video and audio reproduction apparatus according to Embodiment 1 in the present invention.

A video and audio reproduction apparatus according to the present invention will be described hereinafter with reference to drawings.

Embodiment 1

A video and audio reproduction apparatus according to Embodiment 1 in the present invention determines whether or not to display an error message regarding an error occurring in an HDMI. Thereby, the video and audio reproduction apparatus according to Embodiment 1 in the present invention can appropriately display the error message.

Hereinafter, a configuration of the video and audio reproduction apparatus according to Embodiment 1 in the present invention will be described.

FIG. 1 schematically illustrates a video and audio reproduction system 50 including a video and audio reproduction apparatus according to Embodiment 1 in the present invention.

As illustrated in FIG. 1, the video and audio reproduction system 50 includes a DVD player 10 and a television 100. Furthermore, the DVD player 10 and the television 100 are connected to each other through an HDMI cable 60 and a composite cable 61.

The DVD player 10 is a video and audio reproduction apparatus connectable to a video and audio reception apparatus, such as a television and an AV amplifier. The DVD player 10 transmits reproduced video data and audio data to the television 100 through the HDMI cable 60 or the composite cable 61. Furthermore, the DVD player 10 includes a message display unit 14 that is a front panel, and displays, on the message display unit 14, information on reproduction of data. More specifically, the message display unit 14 displays, for example, the counted time of a content that is being played back, an operation status, such as a playback status and a pause status, a current time, and channel information.

The television 100 is a video and audio reception apparatus that receives video data and audio data transmitted by the DVD player 10, displays video using the received video data, and emits sound using the received audio data. The combination of "displaying video" and "emitting sound" is also hereinafter simply referred to as "displaying video". Furthermore, the television 100 displays video using data received through one of the HDMI cable 60 and the composite cable 61. For example, the user sets which data is used for displaying the video by the television 100.

FIG. 2 is a block diagram illustrating a configuration of the DVD player 10.

As illustrated in FIG. 2, the DVD player 10 includes a reproducing unit 11, a first transmission unit 12, a second transmission unit 13, a message display unit 14, and a control unit 15. Furthermore, the control unit 15 includes a display determination unit 16 and a display control unit 17.

The reproducing unit 11 reproduces audio data and video data. More specifically, the reproducing unit 11 reads the audio data and the video data recorded on a medium (DVD), and decodes the read audio data and video data. Here, the reproducing unit 11 includes an optical pick-up, a servo circuit, and an MPEG decoder that are not illustrated.

The first transmission unit 12 converts the audio data and the video data reproduced by the reproducing unit 11 respectively into audio data and video data in accordance with a first standard. Specifically, the first standard is the HDMI standard. Furthermore, the first transmission unit 12 transmits the converted audio data and video data (hereinafter referred to as "HDMI data") to the television 100 through the HDMI cable 60.

The second transmission unit 13 converts the audio data and the video data reproduced by the reproducing unit 11 respectively into audio data and video data in accordance with a second standard. Specifically, the second standard is a standard for a composite video signal. Furthermore, the second transmission unit 13 transmits the converted audio data and video data (hereinafter referred to as "composite data") to the television 100 through the composite cable 61.

The message display unit 14 displays an error message indicating occurrence of an error in the HDMI, in addition to information of the counted time of a content that is being played back, an operation status, such as a playback status and a pause status, a current time, and channel information, for example.

Figure 3:
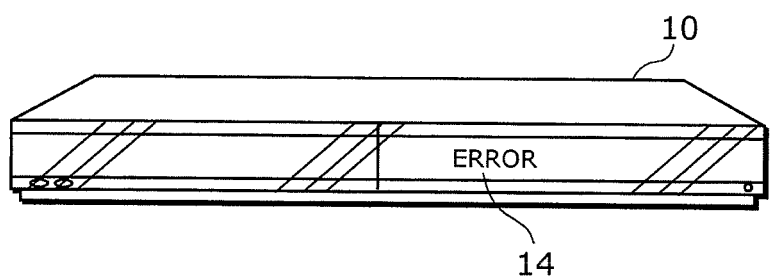
FIG. 3 illustrates a display example of an error message in a video and audio reproduction apparatus according to Embodiment 1 in the present invention.

FIG. 3 illustrates a display example of the error message. As illustrated in FIG. 3, the message display unit 14 does not display other information (counter information of the content that is being played back and the current time, etc) when displaying the error message.

The display determination unit 16 determines whether or not the error message regarding the error occurring in the first transmission unit 12 needs to be displayed. Here, the error occurring in the first transmission unit 12 is an error occurring when the first transmission unit 12 transmits HDMI data, for example, an error that the HDMI data is not correctly transmitted to the television 100.

The display control unit 17 causes the message display unit 14 to display an error message according to a result of the determination by the display determination unit 16. More specifically, the display control unit 17 causes the message display unit 14 to display the error message when the display determination unit 16 determines that the error message needs to be displayed, and does not cause the message display unit 14 to display the error message when the display determination unit 16 determines that the error message need not be displayed.

Next, the operations of the DVD player 10 will be described.

Figure 4:
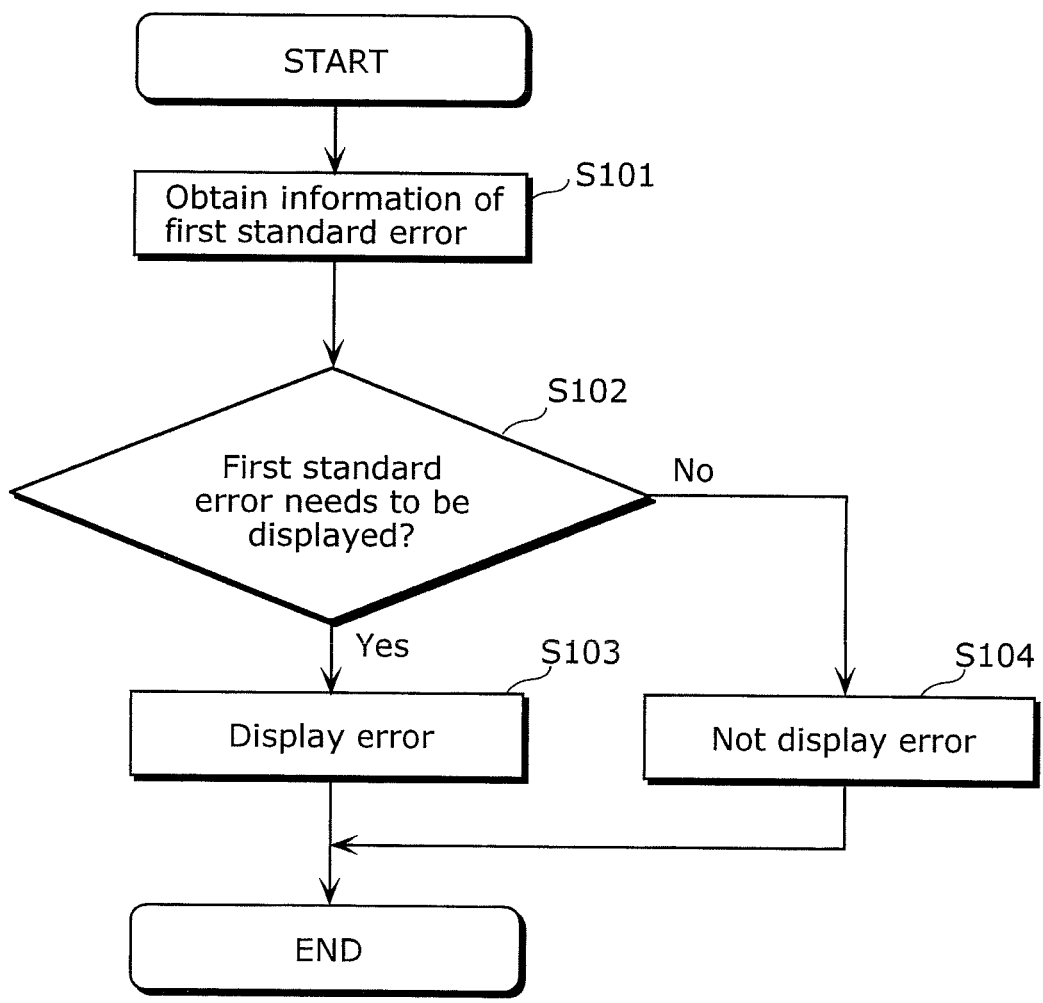
FIG. 4 is a flowchart illustrating the procedure for displaying an error message by a video and audio reproduction apparatus according to Embodiment 1 in the present invention.

FIG. 4 is a flowchart illustrating the procedure for displaying an error message by the DVD player 10.

First, the display determination unit 16 obtains information of an error occurring in the first transmission unit 12 (S101). In other words, the display determination unit 16 obtains information indicating that an error occurs in the first transmission unit 12.

Next, the display determination unit 16 determines whether or not an error message corresponding to the occurring error needs to be displayed (S102).

When the error message needs to be displayed (Yes at S102), the display control unit 17 controls the message display unit 14 to display the error message (S103).

In contrast, when the error message need not be displayed (No at S102), the display control unit 17 controls the message display unit 14 not to display the error message (S104). In other words, the message display unit 14 does not display information other than, for example, the count value that is currently being displayed.

As described above, the DVD player 10 according to Embodiment 1 in the present invention determines whether or not the error message regarding the error occurring in the first transmission unit 12 needs to be displayed. Thereby, the DVD player 10 can appropriately display an error in a situation desired by the user.

Embodiment 2

Embodiment 2 in the present invention describes a specific example of determining whether or not an error message is to be displayed.

The configuration of the DVD player 10 according to Embodiment 2 is approximately the same as that of FIG. 2, and thus the description will be omitted.

Figure 5:
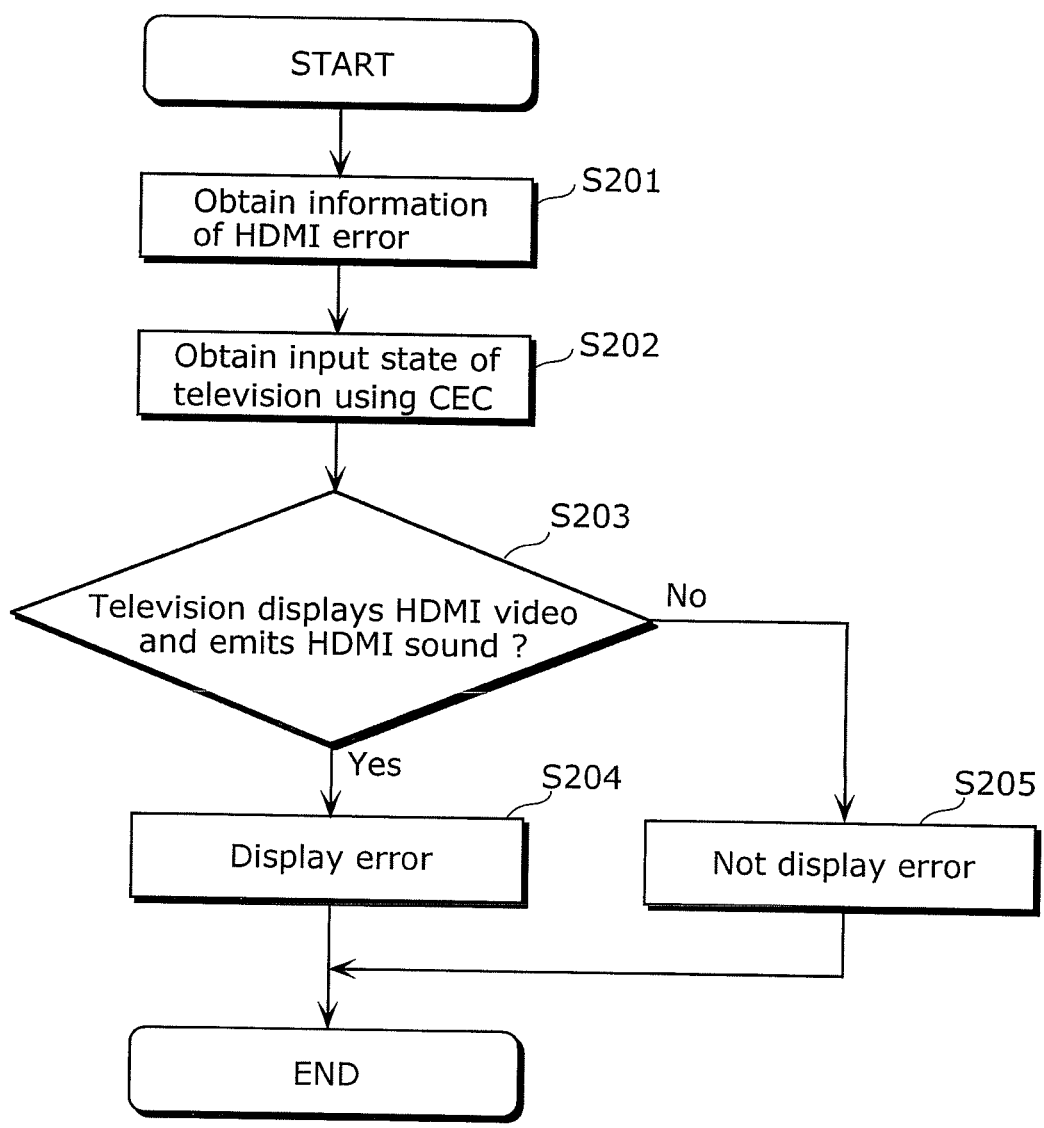
FIG. 5 is a flowchart illustrating the procedure for displaying an error message by a video and audio reproduction apparatus according to Embodiment 2 in the present invention.

FIG. 5 is a flowchart illustrating the procedure for displaying an error message by the DVD player 10 according to Embodiment 2. FIG. 5 differs from FIG. 4 by the processes at Steps S202 and S203.

First, the display determination unit 16 obtains information of an error regarding the HDMI that occurs in the first transmission unit 12 (S201).

Then, the display determination unit 16 obtains, using Consumer Electronics Control (hereinafter abbreviated as "CEC") defined in the HDMI standard, information indicating from which terminal (tuner, composite, component, HDMI, etc.) video data and audio data that are the sources of video displayed on the television 100 and sound emitted to the television 100 are obtained (S202). In other words, the display determination unit 16 obtains information whether the television 100 displays video using HDMI data or using composite data.

Here, the CEC is a standard to be used for controlling apparatuses connected through the HDMI cable 60. Using the CEC, an apparatus can obtain operation information of other apparatuses, and control their operations. For example, the television 100 can be turned on simultaneously when the DVD player is turned on.

Here, the composite standard or others is a standard including one-way data communication (only data transmission from the DVD player 10 to the television 100 is possible). Thus, in accordance with the composite standard, the DVD player 10 cannot obtain information indicating an operation status of the television 100 (which data is being used, etc.). In other words, the user has to determine whether or not an error occurs based on whether or not video is to be displayed on the television 100.

In contrast, the HDMI standard is a standard that includes the one-way data communication and interactive message communication. With the one-way data communication, the video data and the audio data are transmitted from the DVD player 10 to the television 100, whereas with the interactive message communication, information (a message) is transmitted and received between the DVD player 10 and the television 100. Thus, the DVD player 10 can determine whether or not the television 100 displays video using the HDMI data, based on information transmitted from the television 100 in the interactive message communication. Thereby, the DVD player 10 can determine whether or not an error message is displayed.

Next, the display determination unit 16 determines whether or not an error message corresponding to an error occurring in the HDMI needs to be displayed, based on the determination of whether or not the television 100 displays the video using the HDMI data fed to an HDMI terminal (S203). More specifically, when the television 100 displays the video using the HDMI data, the display determination unit 16 determines that the error message needs to be displayed. In contrast, when the television 100 displays video using data other than the HDMI data (such as composite data), the display determination unit 16 determines that the error message need not be displayed.

When the error message needs to be displayed (Yes at S203), the display control unit 17 controls the message display unit 14 to display the error message (S204).

In contrast, when the error message need not be displayed (No at S203), the display control unit 17 controls the message display unit 14 not to display the error message (S205). In other words, the message display unit 14 does not display information other than, for example, the count value that is currently being displayed.

As described above, the DVD player 10 according to Embodiment 2 in the present invention determines whether or not the error message is to be displayed according to an input state of the television 100 that is obtained using the CEC. More specifically, although the DVD player 10 is connected to the HDMI cable 60, it does not display any error message when the television 100 does not currently use the HDMI data. As such, in the case where the user views video except from the HDMI, even when an error occurs in the HDMI, there is no problem that the video is not displayed on the television 100, for example. Thus, the user has any particular problem.

In other words, the DVD player 10 according to Embodiment 2 in the present invention does not display any error message when occurrence of an error does not particularly affect the user's viewing of video. Since the DVD player 10 thereby prevents a message that is not necessary for the user from being displayed, the convenience of the user can be improved.

Embodiment 3

Embodiment 3 in the present invention describes a specific example of an error message to be displayed.

The configuration of the DVD player 10 according to Embodiment 3 is approximately the same as that of FIG. 2, and thus the description will be omitted.

Figure 6:
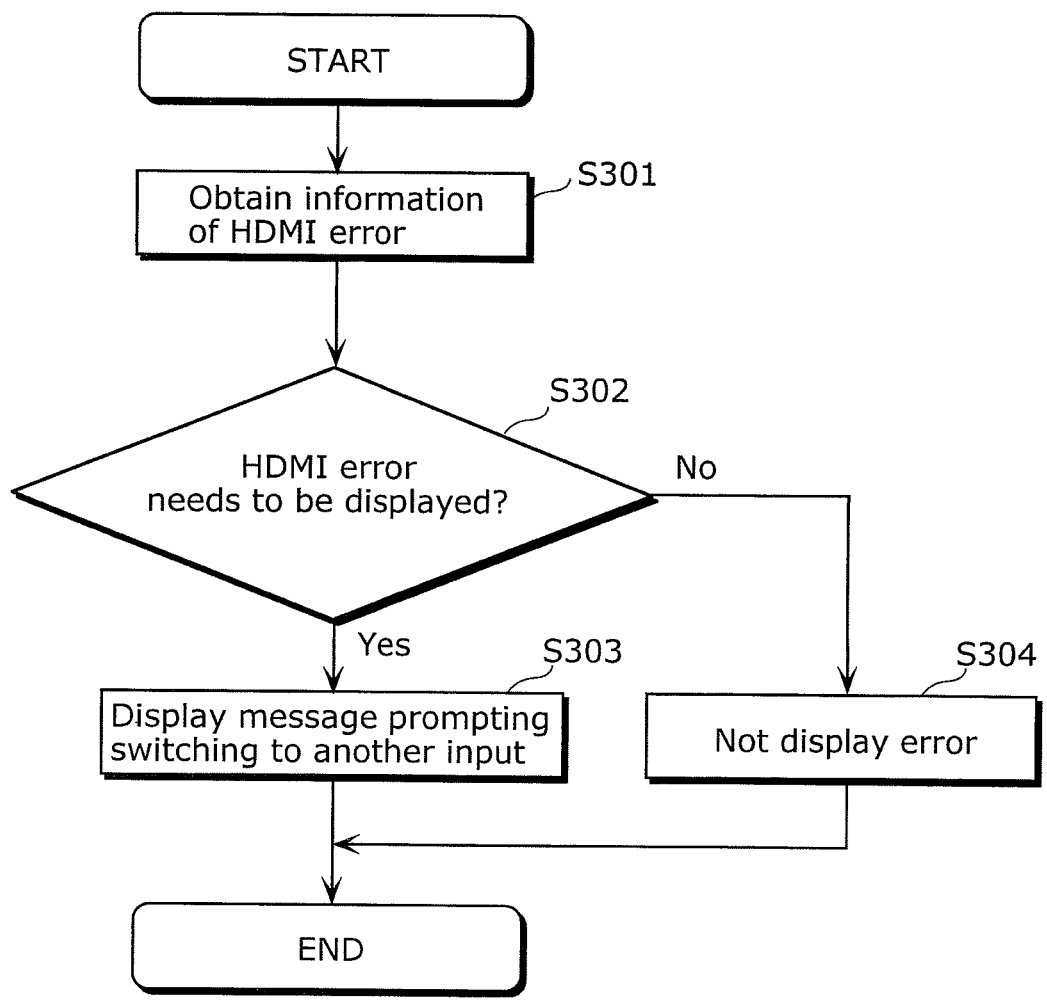
FIG. 6 is a flowchart illustrating the procedure for displaying an error message by a video and audio reproduction apparatus according to Embodiment 3 in the present invention.

FIG. 6 is a flowchart illustrating the procedure for displaying an error message by the DVD player 10 according to Embodiment 3. FIG. 6 differs from FIG. 4 by the process at Step S303.

First, the display determination unit 16 obtains information of an error regarding an HDMI that occurs in the first transmission unit 12 (S301).

Next, the display determination unit 16 determines whether or not an error message corresponding to the occurring HDMI error needs to be displayed (S302). For example, the display determination unit 16 can determine whether or not the error message is to be displayed using the CEC as described in Embodiment 2.

When the error message needs to be displayed (Yes at S302), the display control unit 17 controls the message display unit 14 to display the error message prompting switching from an input of the television 100 to an input other than the HDMI (composite, etc.) (S303). In other words, the message display unit 14 displays the error message prompting switching data to be used by the television 100 for displaying video and emitting sound from HDMI data to composite data.

In contrast, when the error message need not be displayed (No at S302), the display control unit 17 controls the message display unit 14 not to display the error message (S304). In other words, the message display unit 14 does not display information other than, for example, the count value that is currently being displayed.

As described above, the DVD player 10 according to Embodiment 3 in the present invention prompts the user to use another input when the HDMI data cannot be used due to occurrence of an error in the HDMI. Thereby, the user can continuously view the video reproduced by the DVD player 10 in accordance with a message displayed by the DVD player 10.

Embodiment 4

The DVD player 10 according to Embodiment 4 in the present invention switches an input of the television 100 to an input other than an HDMI using the CEC as well as displaying an error message, when the error occurs in the HDMI.

Figure 7:
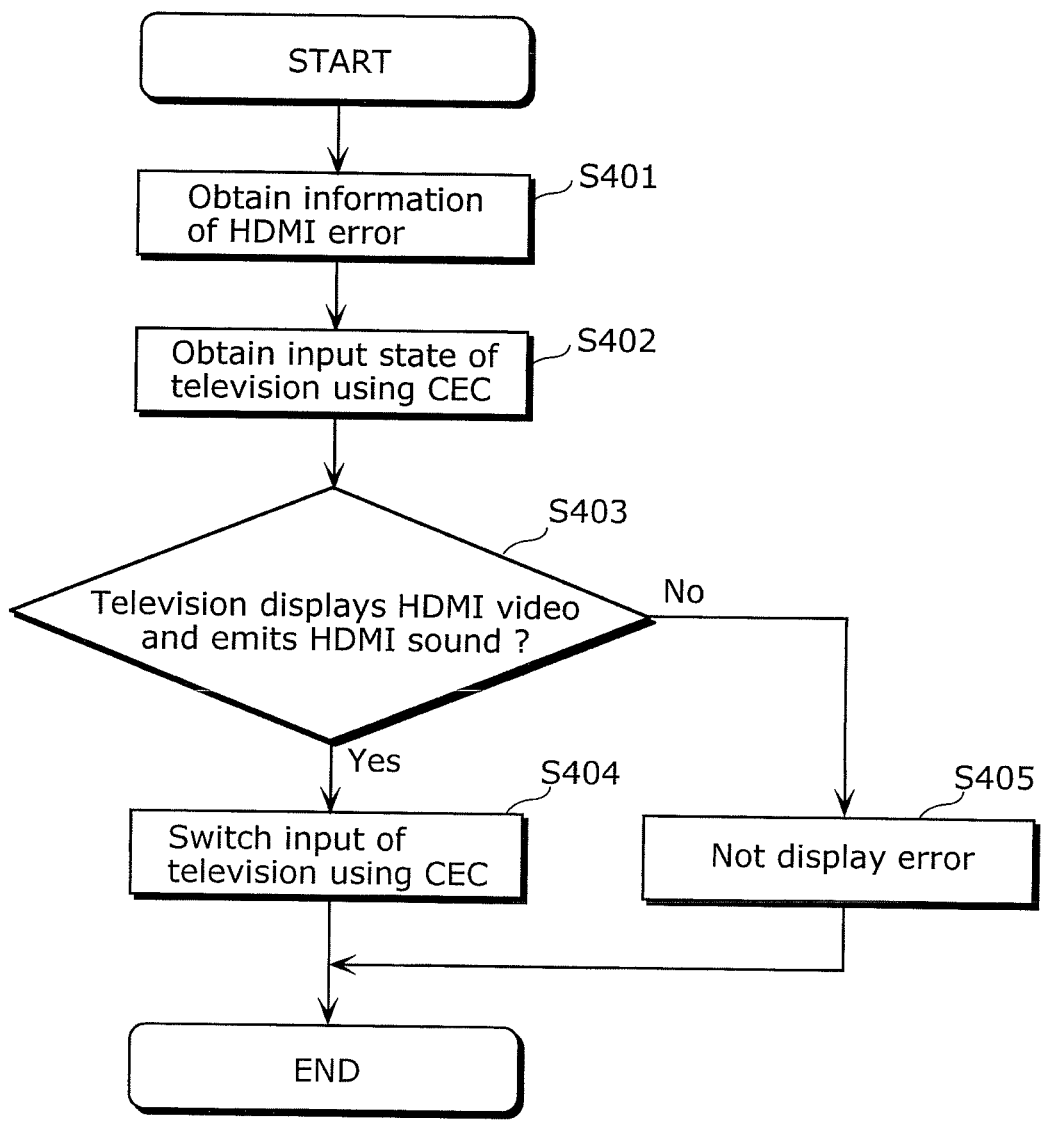
FIG. 7 is a flowchart illustrating the procedure for displaying an error message by a video and audio reproduction apparatus according to Embodiment 4 in the present invention.

The configuration of the DVD player 10 according to Embodiment 4 is approximately the same as that of FIG. 2, and thus the description will be omitted. FIG. 7 differs from FIG. 5 by the process at Step S404.

FIG. 7 is a flowchart illustrating the procedure for displaying an error message by the DVD player 10 according to Embodiment 4.

First, the display determination unit 16 obtains information of an error regarding an HDMI that occurs in the first transmission unit 12 (S401).

Then, the display determination unit 16 obtains, using the CEC, information indicating from which terminal (tuner, composite, component, HDMI, etc.) video data and audio data that are the sources of video displayed on the television 100 and sound emitted to the television 100 are obtained (S402).

Next, the display determination unit 16 determines whether or not an error message corresponding to the error occurring in the HDMI needs to be displayed, based on the determination of whether or not the television 100 displays the video using the HDMI data (S403). More specifically, when the television 100 displays the video using the HDMI data, the display determination unit 16 determines that the error message needs to be displayed. In contrast, when the television 100 displays the video using data other than the HDMI data (such as composite data), the display determination unit 16 determines that the error message need not be displayed.

When the error message needs to be displayed (Yes at S403), the display control unit 17 switches an input of the television 100 from an HDMI to an input other than the HDMI using the CEC (S404). In other words, the display control unit 17 switches data to be used by the television 100 for displaying video and emitting sound from HDMI data to composite data.

Furthermore, the message display unit 14 displays an error message. Here, the display control unit 17 may only switch between inputs of the television 100, and does not have to cause the message display unit 14 to display an error message.

In contrast, when the error message need not be displayed (No at S403), the display control unit 17 controls the message display unit 14 not to display the error message (S405). In other words, the message display unit 14 does not display information other than, for example, the count value that is currently being displayed.

The DVD player 10 according to Embodiment 4 in the present invention switches an input of the television 100 to an input other than an HDMI using the CEC as well as displaying an error message, when the television 100 uses an input of the HDMI and then an error occurs in the HDMI. Thereby, the DVD player 10 can avoid a state where video is not displayed on the television 100, and the user can continuously view video reproduced by the DVD player 10.

Embodiment 5

The DVD player 10 according to Embodiment 5 in the present invention determines whether or not an error message is to be displayed based on whether or not an error occurring in an HDMI is a High-bandwidth Digital Content Protection (HDCP) error.

The configuration of the DVD player 10 according to Embodiment 5 is approximately the same as that of FIG. 2, and thus the description will be omitted.

FIG. 8 is a flowchart illustrating the procedure for displaying an error message by the DVD player 10 according to Embodiment 5. FIG. 8 differs from FIG. 4 by the process at Step S502.

First, the display determination unit 16 obtains information of an error regarding an HDMI that occurs in the first transmission unit 12 (S501).

Next, the display determination unit 16 determines whether or not an error message corresponding to the occurring HDMI error needs to be displayed, based on the determination of whether or not the occurring HDMI error is an HDCP error (S502). More specifically, when the HDMI error is an HDCP error, the display determination unit 16 determines that the error message need not be displayed. In contrast, when the HDMI error is other than the HDCP error, the display determination unit 16 determines that the error message needs to be displayed.

Here, the HDCP standard is an apparatus authentication standard used in the HDMI. In other words, the HDCP error indicates that the apparatus authentication of the HDCP has failed. Here, even when an apparatus conforms to the HDMI standard, the apparatus sometimes does not conform to the HDCP standard. In other words, the display determination unit 16 determines whether or not the television 100 conforms to the HDCP standard. When the television 100 does not conform to the HDCP standard, the display determination unit 16 determines that the error message need not be displayed.

When the HDMI error is not an HDCP error (No at S502), the display control unit 17 controls the message display unit 14 to display the error message (S503).

In contrast, when the HDMI error is an HDCP error (Yes at S502), the display control unit 17 controls the message display unit 14 not to display the error message (S504). In other words, the message display unit 14 does not display information other than, for example, the count value that is currently being displayed.

As described above, the DVD player 10 according to Embodiment 5 in the present invention does not display an error message regarding an error occurring between the DVD player 10 and an apparatus that does not conform to the HDMI standard. Here, the HDCP error is an error less important than, for example, an error occurring when there is a break in a cable. In other words, the HDCP error does not always have to be notified to the user. As such, the DVD player 10 can prevent displaying a message that is not necessary for the user.

At Step S503, the DVD player 10 may display a message that prompts switching between inputs of the television 100 as described in Embodiment 3, and switch between inputs of the television 100 as described in Embodiment 4.

Furthermore as described in Embodiment 2, the DVD player 10 may determine whether or not the television 100 uses HDMI data, and when the television 100 uses the HDMI data (Yes at S203), the DVD player 10 may further perform the processes after Step S502 in FIG. 8.

Embodiment 6

The DVD player 10 according to Embodiment 6 in the present invention is a modification of the DVD player 10 according to Embodiment 5. When an error occurring in an HDMI is an HDCP error, the DVD player 10 transmits, to the television 100, video displayable even without conformance to the HDCP standard. Thereby, the user can determine whether the error is caused by no conformance to the HDCP standard or a break in a cable.

The configuration of the DVD player 10 according to Embodiment 6 is approximately the same as that of FIG. 2, and thus the description will be omitted.

FIG. 9 is a flowchart illustrating the procedure for displaying an error message by the DVD player 10 according to Embodiment 6. FIG. 9 differs from FIG. 8 by the process at Step S604.

First, the display determination unit 16 obtains information of an error regarding an HDMI that occurs in the first transmission unit 12 (S601).

Next, the display determination unit 16 determines whether or not an error message corresponding to the occurring HDMI error needs to be displayed, based on the determination of whether or not the occurring HDMI error is an HDCP error (S602). More specifically, when the HDMI error is an HDCP error, the display determination unit 16 determines that an error message need not be displayed. In contrast, when the HDMI error is other than the HDCP error, the display determination unit 16 determines that an error message needs to be displayed.

When the HDMI error is not an HDCP error (No at S602), the display control unit 17 controls the message display unit 14 to display the error message (S603).

In contrast, when the HDMI error is an HDCP error (Yes at S602), the display control unit 17 causes the first transmission unit 12 to transmit, to the television 100, video data and audio data that do not require authentication defined in the HDCP (S604). In other words, the first transmission unit 12 transmits, to the television 100, the video data and audio data that are displayable even without conformance to the HDCP standard. Thereby, the television 100 can display and provide video data and audio data that do not require authentication, except when the television 100 cannot receive data due to a break in the HDMI cable 60. In this case, the message display unit 14 may or may not display an error message. Furthermore, the first transmission unit 12 has only to transmit at least one of the video data and audio data that do not require authentication.

As described above, the DVD player 10 according to Embodiment 6 in the present invention transmits data that does not require authentication to the television 100 in the case of occurrence of an HDCP error. Thereby, even when an error occurs due to a break in the HDMI cable 60 and others, video is not displayed on the television 100. When an error occurs due to no conformance to the HDCP standard, video is displayed on the television 100. Thus, the user can determine whether there is a break in the HDMI cable 60 or the television 100 does not conform to the HDCP standard, based on whether or not video is to be displayed on the television 100.

At Step S603, the DVD player 10 may display a message that prompts switching between inputs of the television 100 as described in Embodiment 3, and switch between inputs of the television 100 as described in Embodiment 4.

Furthermore as described in Embodiment 2, the DVD player 10 may determine whether or not the television 100 uses HDMI data, and when the television 100 uses the HDMI data (Yes at S203), the DVD player 10 may further perform the processes after Step S602 in FIG. 9.

Embodiment 7

The DVD player 10 according to Embodiment 7 in the present invention determines whether or not an error message is to be displayed according to setting information set by the user.

The configuration of the DVD player 10 according to Embodiment 7 is approximately the same as that of FIG. 2, and thus the description will be omitted.

FIG. 10 is a flowchart illustrating the procedure for displaying an error message by the DVD player 10 according to Embodiment 7. FIG. 10 differs from FIG. 4 by the processes at Steps S702 and S703.

First, the display determination unit 16 obtains information of an error regarding an HDMI that occurs in the first transmission unit 12 (S701).

Next, the display determination unit 16 obtains setting information set by the user (S702). Here, the setting information is information indicating whether or not an error message is to be displayed, and is set by the user in advance. Furthermore, the setting information is stored in a storage unit (not illustrated) included in the DVD player 10.

Next, the display determination unit 16 determines whether or not an error message corresponding to the occurring HDMI error needs to be displayed, based on the obtained setting information (S703). In other words, when the setting information indicates that the error message is to be displayed, the display determination unit 16 determines that the error message needs to be displayed. In contrast, when the setting information indicates that the error message is not displayed, the display determination unit 16 determines that the error message need not be displayed.

When the error message needs to be displayed (Yes at S703), the display control unit 17 controls the message display unit 14 to display the error message (S704).

In contrast, when the error message need not be displayed (No at S703), the display control unit 17 controls the message display unit 14 not to display the error message (S705). In other words, the message display unit 14 does not display information other than, for example, the count value that is currently being displayed.

The DVD player 10 according to Embodiment 7 in the present invention determines whether or not an error message is to be displayed according to setting information set by the user. Thereby, the DVD player 10 can display an error message only when the user needs the display.

At Step S704, the DVD player 10 may display a message that prompts switching between inputs of the television 100 as described in Embodiment 3, and switch between inputs of the television 100 as described in Embodiment 4.

Furthermore, when the error message needs to be displayed at S703 (Yes at S703), the DVD player 10 may perform the determination process as described in Embodiments 2, 5, or 6, or two or more of the determination processes of Embodiments 2, 5, and 6. Similarly, the DVD player 10 may perform the processes after Step S702 in FIG. 10 after a determination process identical to the process in Embodiment 2, 5, or 6.

Although the DVD player 10 according to Embodiments in the present invention is described hereinbefore, the present invention is not limited to Embodiments.

For example, the functions of the DVD player 10 described in at least two or more of Embodiments 1 to 7 may be combined.

Furthermore, although the example of the DVD player is described as a video and audio reproduction apparatus according to the present invention in the description, the video and audio reproduction apparatus may be any video and audio reproduction apparatus that provides video data and audio data, such as a DVD recorder, a BD player, a BD recorder, and a hard disc recorder.

Furthermore, although the example of the television 100 is described as a video and audio reception apparatus in the description, the video and audio reception apparatus may be any video and audio reception apparatus that at least displays video and emits sound, such as an AV amplifier, a projector, and a display.

Furthermore, each of the functional blocks in FIG. 2 may be implemented by a dedicated circuit (hardware), or by executing a program using a processor, such as a CPU.

Furthermore, although the DVD player 10 and the television 100 are connected to each other through two cables of the HDMI cable 60 and the composite cable 61 in the description, they may be connected through three or more cables.

Furthermore, the standard to which the first transmission unit 12 conforms is not limited to the HDMI standard. As long as the standard allows at least interactive message communication, any standard may be used.

Furthermore, the standard to which the second transmission unit 13 conforms is not limited to the composite standard, but any standard may be used.

Furthermore, the standards to which the first transmission unit 12 and the second transmission unit 13 conform are not limited to standards for wired connection, but may be standards that wirelessly perform data communication.

Furthermore, although the message display unit 14 does not display other information (counter information of the content that is being played back and the current time, etc) when displaying the error message in the description, it may display a part of or an entire of the other information.

INDUSTRIAL APPLICABILITY

The present invention is applicable to a video and audio reproduction apparatus, and in particular, to a DVD player, a DVD recorder, a BD recorder, and a BD player that conform to the HDMI standard.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to a video and audio reproduction apparatus, and in particular, to a DVD player, a DVD recorder, a BD recorder, and a BD player that conform to the HDMI standard.

What is claimed is:

1. A video and audio reproduction apparatus connectable to a video and audio reception apparatus that displays video and emits sound, said video and audio reproduction apparatus comprising:
   a reproducing unit configured to reproduce audio data and video data;
   a first transmission unit configured to convert, into first data in accordance with a first standard, the audio data and the video data reproduced by said reproducing unit, and to transmit the first data to the video and audio reception apparatus;
   a second transmission unit configured to convert, into second data in accordance with a second standard, the audio data and the video data reproduced by said reproducing unit, and to transmit the second data to the video and audio reception apparatus;
   a message display unit configured to display a message;
   a display determination unit configured to determine, based on information transmitted from the video and audio reception apparatus, which is external to the video and audio reproduction apparatus, in interactive message communication included in the first standard, whether the video and audio reception apparatus displays the video and emits the sound using the first data or the second data, to determine to display an error message regarding an error occurring in said first transmission unit when the video and audio reception apparatus displays the video and emits the sound using the first data, and to determine not to display the error message when the video and audio reception apparatus displays the video and emits the sound using the second data; and
   a display control unit configured to cause said message display unit to display the error message when said display determination unit determines to display the error message, and not to cause said message display unit to display the error message when said display determination unit determines not to display the error message.

2. The video and audio reproduction apparatus according to claim 1, wherein said display control unit is configured to cause said message display unit to display the error message when said display determination unit determines to display the error message, the error message prompting switching of data to be used by the video and audio reception apparatus for displaying the video and emitting the sound from the first data to the second data.

3. The video and audio reproduction apparatus according to claim 1, wherein said display control unit is further configured to cause the video and audio reception apparatus to switch data to be used for displaying the video and emitting the sound from the first data to the second data, when said display determination unit determines to display the error message.

4. The video and audio reproduction apparatus according to claim 1, wherein said display determination unit is further configured to determine not to display the error message regarding the error when the error is defined in an apparatus authentication standard used in the first standard.

5. The video and audio reproduction apparatus according to claim 1, wherein said display determination unit is further configured to control said first transmission unit to transmit, to the video and audio reception apparatus, one of the video data and the audio data that does not require apparatus authentication in accordance with an apparatus authentication standard, when the error is defined in the apparatus authentication standard used in the first standard.

6. The video and audio reproduction apparatus according to claim 4, wherein the apparatus authentication standard is an HDCP standard.

7. The video and audio reproduction apparatus according to claim 1, further comprising a setting storage unit configured to store setting information indicating whether or not the error message regarding the error occurring in said first transmission unit is to be displayed, the setting information being set by a user operation, wherein said display determination unit is further configured to determine whether or not the error message regarding the error occurring in said first transmission unit is to be displayed, based on the setting information stored by said setting storage unit.

8. The video and audio reproduction apparatus according to claim 1, wherein the first standard is an HDMI standard.

9. The video and audio reproduction apparatus according to claim 1, wherein the second standard is one of a composite standard and a component standard.

10. A video and audio reproduction method performed by a video and audio reproduction apparatus connectable to a video and audio reception apparatus that displays video and emits sound, said method comprising:

reproducing audio data and video data;

converting, into first data in accordance with a first standard, the audio data and the video data reproduced in said reproducing, and transmitting the first data to the video and audio reception apparatus;

converting, into second data in accordance with a second standard, the audio data and the video data reproduced in said reproducing, and transmitting the second data to the video and audio reception apparatus;

determining, based on information transmitted from the video and audio reception apparatus, which is external to the video and audio reproduction apparatus, in interactive message communication included in the first standard, whether the video and audio reception apparatus displays the video and emits the sound using the first data or the second data, to determine to display an error message regarding an error occurring in said transmitting of the first data when the video and audio reception apparatus displays the video and emits the sound using the first data, and to determine not to display the error message when the video and audio reception apparatus displays the video and emit the sound using the second data; and displaying the error message when it is determined in said determining to display the error message, and not displaying the error message when it is determined in said determining not to display the error message.

* * * * *